United States Patent [19]
Connac

[11] 3,811,351
[45] May 21, 1974

[54] METHOD AND APPARATUS FOR CUTTING SAW-TEETH FROM THE WEBS OF STRUCTURAL SHAPES

[76] Inventor: Gabriel Henri Connac, 10, rue Grenet, Vichy, France

[22] Filed: Mar. 21, 1973

[21] Appl. No.: 343,209

[30] Foreign Application Priority Data
Mar. 24, 1972 France .......................... 72.10398

[52] U.S. Cl. ................................... 83/49, 83/694
[51] Int. Cl. ...................... B23d 15/08, B23d 23/00
[58] Field of Search ........................... 83/49, 7–9, 83/36, 56, 694, 449, 52

[56] References Cited
UNITED STATES PATENTS
3,283,634   11/1966   Lodjic ............................ 83/449 X Primary Examiner—J. M. Meister
Attorney, Agent, or Firm—Brisebois & Kruger

[57] ABSTRACT

Saw-teeth are cut from webs of structural shapes which are to be reconnected in a conventional manner at the tips of the teeth so as to form light beams having a high moment of inertia. The method consists in cutting the web of the shape step-by-step between two tools, each comprising two zones, one of which is a shearing zone proper extending along the length equal to one pitch of the saw-teeth and in which each cutting edge of a tool is substantially parallel to the corresponding edge of the other tool and the other of which is a transition zone immediately preceeding the cutting zone and in which the corresponding cutting edges diverge.

3 Claims, 5 Drawing Figures

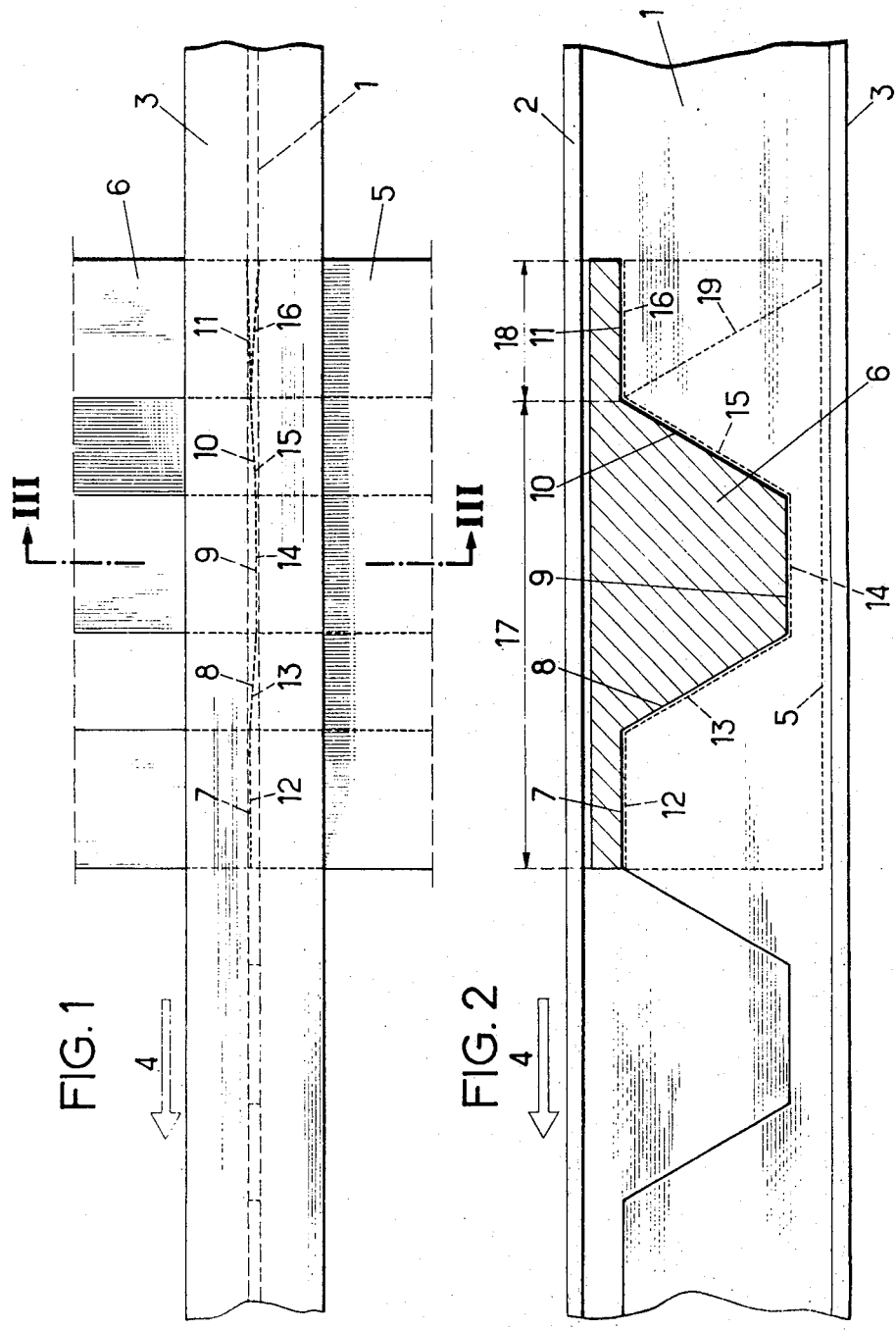

METHOD AND APPARATUS FOR CUTTING SAW-TEETH FROM THE WEBS OF STRUCTURAL SHAPES

SUMMARY OF THE INVENTION

This invention relates to the cutting of saw-teeth in the webs of structural shapes preparatory to reconnecting two sections thereof at the summits of these teeth in order to produce light beams having a large moment of inertia. As used in this application the term "structural shapes" is intended to include elongated members whether made of metal or not, such as I-beams, channel members, structural angles, or even simple flat metal strips.

Teeth along the length of a section of a structural shape having the length required for the intended use are now generally formed by cutting with an oxygen torch. This process has the disadvantage of causing a loss of metal, but even more importantly it imparts irregular contours to and causes thermodeformation of the two sections, which complicates the operation of subsequently welding them together.

In order to overcome this disadvantage it has been suggested that cold cutting processes be used, but since it is impossible to shear the entire length of the beam in a single step this process has conventionally involved successive punching steps to cut the inclined flanks of the teeth, followed by successive shearing steps connecting the punched out parts and defining the summits of the teeth. The resulting sections have consequently much more regular contours and are free of thermodeformations. On the other hand, they require an exceedingly complicated press equipped with punching and shearing tools, and require the exertion of substantial force in order to carry out the punching, and result in a certain loss of metal where the punching takes place.

The object of this invention is to eliminate the foregoing disadvantages by cold cutting the web with a pure shearing action without loss of metal and utilizing only a shearing tool without any punch, which tool requires only a press of relatively small capacity.

The invention consists in shearing the web of the structural shape step-by-step between two tools having two zones in which a shearing zone proper extends over a length equal to the pitch of the saw-tooth and in which each shearing edge of a tool is substantially parallel to the corresponding edge of the other tool, and a transition zone immediately preceeding said shearing zone so as to be first encountered by the web of the structural shape in its step-by-step travel, and in which the corresponding shearing edges diverge in such a manner that the shearing is completed near the shearing zone and does not occur at all at the free end, the path of travel of one of the tools with respect to the other being restricted to the minimum necessary in order to avoid the introduction of elastic deformation into the parts being sheared.

The transition zone is preferably limited to a longitudinal straight part corresponding to the top of a tooth in order to correctly connect successive cuts independently of the accuracy of the device for advancing the shape step-by-step. In order that the invention may be better understood a preferred embodiment thereof will now be described, purely by way of illustration and example, with reference to the accompanying drawings, on which:

FIG. 1 is an elevational view of a shape positioned between two shearing tools;

FIG. 2 is a top plan view of FIG. 1;

Figure 3:
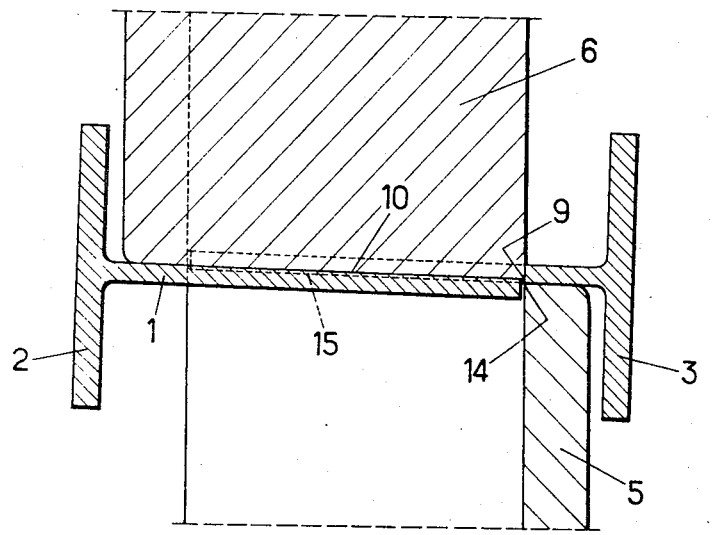
FIG. 3 is a sectional view taken along the line III—III of FIG. 1.

The selected example illustrates the most usual case in which the original structural shape has an I-section with a web 1 and two flanges 2 and 3. This structural shape is advanced step-by-step in the direction of the arrow 4 between two shearing tools, with the lower tool 5 fixed to the stationary plate on the press and a movable upper tool 6 mounted on the upper plate of this press. Of course, it would be possible to use a horizontal press just as well. FIGS. 1, 2 and 3 represent the positions at the end of the press cycle.

The upper tool 6 consists, for example, of a prismatic block shaped as shown on FIG. 2 and carries at its lower end a slightly inclined surface as shown in FIG. 3, which defines five cutting edges 7, 8, 9, 10 and 11. The lower tool 5 also consists of a prismatic block shaped as shown on the figures and terminating at its upper edge in a surface parallel to the surface of the tool 6 and defining the successive cutting edges 12, 13, 14, 15 and 16 corresponding respectively to the edges 7, 8, 9, 10 and 11.

In the zone 17 extending for one pitch along the length of the saw-tooth profile, the edges 12, 13, 14 and 15 practically coincide at the end of their stroke with the edges 7, 8, 9 and 10, except for the slight horizontal play which is required and a minimum penetration of one tool into the other. On the other hand, in the zone 18 at the beginning of the shearing zone with respect to its direction of travel 4, the edge 16 of the lower tool forms an open angle with the corresponding edge of the upper tool, as shown on FIG. 1. This angle is formed by a second surface of the lower tool 5 which is connected at 19 with the first-mentioned surface thereof.

The common transverse inclination of the working faces of the tools 5 and 6 in the zone 17 produces, over the length of the teeth a maximum separation between the cutting edges equal to the thickness of the web 1. In like manner the inclination of the edge 16 with respect to the edge 11 measured this time in the longitudinal direction produces, over the length of the zone 18, a maximum separation of the cutting edges equal to the height of the web 1. The zone 18 may comprise several sides of the polygonal line, but for reasons of simplification may be limited to the length of the summit of a tooth in order to have a single straight longitudinal line in which the shearing increases from a zero value at the input end, that is to say at the right side of the figures, to the complete thickness of the web in the zone 17.

In this manner at each cycle of the press the shearing is progressively initiated in the zone 18 and completed in the zone 17. After opening of the press the structural shape 1 is advanced by a distance equal to the tooth pitch, that is to say, the length of the zone 17, so that the straight part previously in the zone 18 is now completely sheared between the edges 7 and 12. In this manner, the device (not shown) which advances the structural shape 1 step-by-step need not operate with any very high degree of precision, since the two straight parts will coincide in any event and a slight displacement in the longitudinal direction will have no undesirable consequences, except for a reduction in the precision of the member, while retaining the precision required for subsequent welding.

Figure 4:
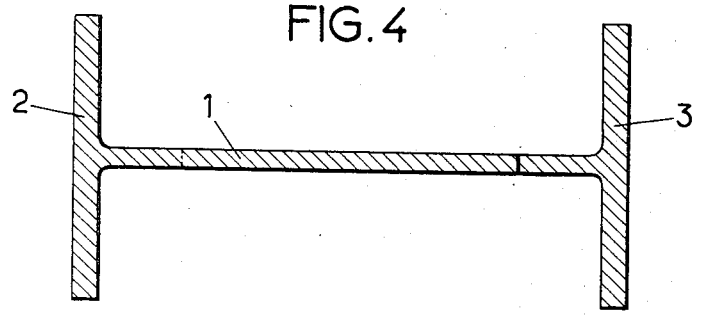
FIG. 4 is a sectional view corresponding to FIG. 3 after the sheared portion has passed beyond the tools.

It will be seen that with this process the power required for the press corresponds exactly to that required to cut along the lines 7, 8, 9 and 10 plus a corresponding part of the line 11, which is a much smaller force than is required in the case of punching which doubles the length of certain of these lines. On the other hand, with a single set of shearing tools and a press, the desired result is achieved by advancing the structural shape step-by-step. Naturally, at each descent of the press, the two parts of the structural shape deform in the manner shown on FIG. 3 partly by flexing the teeth cut in their plane and partly by bending the parts constituted by the flanges 2 and 3 and the remainder of the web. With the customary thickness of the web and the heights of the teeth these deformations remain within the elastic limit if the descent of the press is adjusted for its minimum stroke as described above so that at each opening of the press the shape leaving the tool automatically resumes its symmetrical form as shown on FIG. 4.

Finally, in addition to the indicated simplicity, it should be noted that the accuracy of the shearing and the absence of deformations imposed on the two sections as has been set forth makes it possible to greatly facilitate the welding operation by simply bringing the two sections together.

Figure 5:
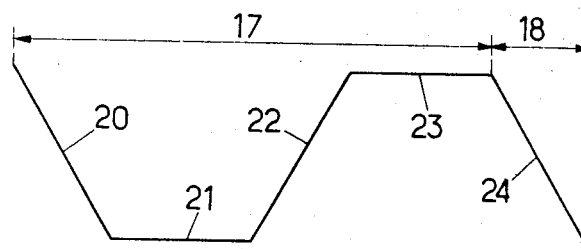
FIG. 5 is a schematic illustration of a variation in the shearing line.

It will of course be appreciated that the embodiments which have been described have been given purely by way of illustration and example and may be modified as to detail without thereby departing from the basic principle of the invention. In particular, the shape of the teeth may be as shown in FIG. 5 with a shearing zone 17 comprising a trapezoidal region 20, 21 and 22 plus a tooth-tip 23 and a transition zone 18 comprising a tooth flank 24. In this case, at each advance of the structural shape, the part partially sheared by 24 is brought into coincidence with the part 20 which requires that the advancing means operate with greater precision. On the contrary, since the length of the part 24 is greater than that of the preceding part 16, the connection may be made more easily from the point of view of slope and deformation.

What is claimed is:

1. Method of shearing the web of a structural shape along a saw-tooth line, which method comprises the steps of advancing the shape step-by-step between two shearing tools carried by two relatively movable members of a press, which tools comprise a shearing zone extending for the length of the pitch of a tooth and in which each cutting edge of one tool is substantially parallel to the corresponding cutting edge of the other tool, and a transition zone which precedes the shearing zone and in which the corresponding cutting edges of the two tools diverge so that the web is completely cut at the edge of the transition zone adjacent the shearing but remains uncut at the opposite edge of said transition zone, and limiting the stroke of the press to the minimum necessary to shear the shape in the shearing zone.

2. Method as claimed in claim 1 in which the transition zone corresponds to a tooth summit.

3. Apparatus for shearing the web of a structural shape along a saw-tooth line, which apparatus comprises two shearing tools mounted for relative movement, each tool comprising a shearing zone extending over a distance equal to the pitch of a tooth in which each cutting edge of each tool is substantially parallel to the corresponding cutting edge of the other tool, and a transition zone at one end of said shearing zone in which the corresponding cutting edges of the two tools are positioned at an angle to each other, and means for producing relative movement of said tools to shear a web positioned therebetween while limiting said movement to the minimum sufficient to shear said web in said shearing zone while leaving it partially unsheared in said transition zone.

* * * * *